(12) United States Patent
Kim et al.

(10) Patent No.: US 9,319,894 B2
(45) Date of Patent: Apr. 19, 2016

(54) METHOD FOR TRANSMITTING AND RECEIVING POWER OUTAGE REPORT AND DEVICE THEREFOR

(75) Inventors: Jeongki Kim, Anyang-si (KR); Youngsoo Yuk, Anyang-si (KR); Jinsam Kwak, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 183 days.

(21) Appl. No.: 13/981,466

(22) PCT Filed: Jan. 25, 2012

(86) PCT No.: PCT/KR2012/000596
§ 371 (c)(1),
(2), (4) Date: Jul. 24, 2013

(87) PCT Pub. No.: WO2012/102547
PCT Pub. Date: Aug. 2, 2012

(65) Prior Publication Data
US 2013/0315074 A1    Nov. 28, 2013

Related U.S. Application Data

(60) Provisional application No. 61/436,174, filed on Jan. 25, 2011.

(51) Int. Cl.
*H04W 24/00* (2009.01)
*H04W 8/24* (2009.01)
*H04W 52/02* (2009.01)
(Continued)

(52) U.S. Cl.
CPC ............. *H04W 24/00* (2013.01); *H04W 8/24* (2013.01); *H04W 52/0216* (2013.01); *H04W 52/0219* (2013.01); *H04W 72/0413* (2013.01); *H04W 72/0453* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 2007/0206561 A1* | 9/2007 | Son et al. | 370/346 |
| 2008/0232330 A1 | 9/2008 | Lee et al. | |
| 2009/0190560 A1 | 7/2009 | Kim et al. | |

(Continued)

FOREIGN PATENT DOCUMENTS

| | | |
|---|---|---|
| CN | 101809935 A | 8/2010 |
| CN | 101895928 A | 11/2010 |

(Continued)

OTHER PUBLICATIONS

Zhu et al, "Proposed text changes to the IEEE 802.16m SDD (802.16m-08/003r6), Section 11.9.2.5 on the Bandwidth Request Channel", Jan. 5, 2009.*

(Continued)

*Primary Examiner* — Thai Nguyen
(74) *Attorney, Agent, or Firm* — Birch, Stewart, Kolasch & Birch, LLP

(57) ABSTRACT

Disclosed are a method for transmitting and receiving a power outage report and a device therefor. According to the present invention, a method for allowing a machine to machine (M2M) device to transmit a power outage report comprises a step of transmitting, to a base station, a first message which contains a bandwidth request (BR) index value defined in advance if a power outage occurs, wherein said BR index value defined in advance is allocated to indicate to said M2M device that the power outage has occurred.

11 Claims, 10 Drawing Sheets

(51) Int. Cl.
*H04W 72/04* (2009.01)
*H04W 92/18* (2009.01)

(56) References Cited

U.S. PATENT DOCUMENTS

2010/0177730 A1 7/2010 Okuda
2011/0013717 A1* 1/2011 Josiam et al. .................. 375/295
2012/0226930 A1* 9/2012 Colban et al. .................. 713/340

FOREIGN PATENT DOCUMENTS

| EP | 2 207 384 A2 | 7/2010 |
| KR | 10-2007-0036004 A | 4/2007 |
| KR | 10-2007-0119474 A | 12/2007 |

OTHER PUBLICATIONS

"Abnormal Outage Report in 802.16p" Wei et al, Dec. 31, 2010.*

* cited by examiner

* PCS indicator : power outage contention BR/ranging stop indicator

\* PCS indicator : power outage contention BR/ranging stop indicator

METHOD FOR TRANSMITTING AND RECEIVING POWER OUTAGE REPORT AND DEVICE THEREFOR

CROSS REFERENCE TO RELATED APPLICATIONS

This application is the National Phase of PCT/KR2012/000596 filed on Jan. 25, 2012, which claims priority under 35 U.S.C. 119(e) to U.S. Provisional Application Nos. 61/436,174 filed on Jan. 25, 2011, all of which are hereby expressly incorporated by reference into the present application.

TECHNICAL FIELD

The present invention relates to a wireless communication system, and more particularly, to a method of transmitting and receiving a power outage report and apparatus therefor.

BACKGROUND ART

Generally, a machine-to-machine (hereinafter abbreviated M2M) communication literally means a communication between one electronic device and another electronic device. In a broad sense, the M2M communication may mean a wire/wireless communication between electronic devices or a communication between a human-controllable device and a machine. Recently, the M2M communication may generally indicate a communication between electronic devices, i.e., a device-to-device wireless communication performed without human involvement.

In the early 1990's, in which the concept of the M2M communication has been initially introduced, the M2M communication has been recognized as remote control or telematics or the like and derivative markets of the M2M communication were very limitative. Yet, the M2M communication has grown rapidly for past few years and has become the globally noteworthy markets. Specifically, in POS (point of sales) and security related application markets, the M2M communication has considerably influence on such field as fleet management, remote monitoring of machinery and equipment, smart meter for auto-measurement of operating time, consumed heat or electricity quantity on construction machinery equipment and the like. M2M communication in the future will be further utilized for various usages in connection with a small-scale output communication solution such as conventional mobile communication, wireless high-speed internet, Wi-Fi, ZigBee and the like and may lay the foundation of expansion to B2C (business to consumer) markets instead of being confined to B2B (business to business) markets.

In the era of the M2M communication, every machine equipped with SIM (subscriber identity module) card enables data transmission and reception and is capable of remote management and control. For instance, as M2M communication technology is usable for numerous devices and equipment including vehicles, trucks, containers, auto-vending machines, gas tanks and the like, its application fields may reach far and wide.

According to a related art, since mobile stations are managed by individual unit in general, a communication between a base station and a mobile station is usually performed by a one-to-one communication scheme. Assuming that numerous M2M devices communicate with a base station by the one-to-one communication scheme, network may be overloaded due to the occurrence of signaling between the base station and each of the numerous M2M devices. As mentioned in the above description, in case that the M2M communications are rapidly spreading across a wider scope, overheads due to the communications between the M2M devices or the communications between the base station and the M2M devices may cause problems.

In this process, many collision resolution processes occur to cause a problem of unnecessary power consumption of M2M devices and a problem of degradation of efficiency of system resources. However, any detailed solutions for these problems have not been proposed yet.

DISCLOSURE OF THE INVENTION

Technical Tasks

One technical task of the present invention is to provide a method for an M2M device to transmit a power outage report. Another technical task of the present invention is to provide a method for a base station to receive a power outage report. Another technical task of the present invention is to provide an M2M device configured to transmit a power outage report. A further technical task of the present invention is to provide a base station device configured to receive a power outage report.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of transmitting a power outage report of an M2M (machine-to-machine) device, which is transmitted by the M2M device in a wireless communication system, according to one embodiment of the present invention may include the step of sending a $1^{st}$ message including a predefined bandwidth request (BR) index value to a base station in case of an occurrence of a power outage situation, wherein the predefined BR index value is assigned to indicate that the power outage situation has occurred in the M2M device. Preferably, the $1^{st}$ message may include a message for a bandwidth request. More preferably, the M2M device may include a device currently operating in connected mode. Preferably, the method may further include the step of receiving a $2^{nd}$ message including an indication indicating whether the M2M device should stop a bandwidth request process from the base station. More preferably, if the $2^{nd}$ message indicates not to stop the bandwidth request process, the M2M device may perform a remaining bandwidth request. Preferably, the predefined BR index value may be assigned as a value corresponding to a specific value of a BR action field in a DSA (dynamic service addition) performing process. More preferably, the specific value of the BR action field may include 0b11.

To further achieve these and other advantages and in accordance with the purpose of the present invention, a method of transmitting a power outage report of an M2M (machine-to-machine) device, which is transmitted by the M2M device in a wireless communication system, according to another embodiment of the present invention may include the step of receiving a $1^{st}$ message indicating to stop or defer a power outage indicator transmission for indicating an occurrence of a power outage situation from a base station, wherein the M2M device reserves the power outage indicator transmission and stands by for a preset time interval based on the $1^{st}$ message. Preferably, the method may further include the steps of receiving a $2^{nd}$ message including resource allocation information for the power indicator transmission from the base station and transmitting the power outage indicator via a corresponding resource based on the $2^{nd}$ message. Preferably, the $1^{st}$ message may include one of an AAI-RNG-ACK message, an AAI-RNG-RSP message, an AAI-M2M-PO-IND message, a non-user specific A-MAP IE (NUS A-MAP IE) message, an extended NUS A-MAP IE message, a super frame header IE message and a BR-ACK A-MAP IE message.

To further achieve these and other advantages and in accordance with the purpose of the present invention, a method of receiving a power outage report of an M2M (machine-to-machine) device, which is received by a base station in a wireless communication system, according to another embodiment of the present invention may include the step of receiving a $1^{st}$ message including a predefined bandwidth request (BR) index value from the M2M device having a power outage situation occurred therein, wherein the predefined BR index value is assigned to indicate that the power outage situation has occurred in the M2M device. Preferably, the $1^{st}$ message may include a message for a bandwidth request. Preferably, the method may further include the step of transmitting a $2^{nd}$ message including an indication indicating whether the M2M device should stop a bandwidth request process to the M2M device.

To further achieve these and other advantages and in accordance with the purpose of the present invention, an M2M (machine-to-machine) device, which transmits a power outage report in a wireless communication system, according to another embodiment of the present invention may include a transmitter configured to send a $1^{st}$ message including a predefined bandwidth request (BR) index value to a base station in case of an occurrence of a power outage situation, wherein the predefined BR index value is assigned to indicate that the power outage situation has occurred in the M2M device. Preferably, the M2M device may further include a receiver configured to receive a $2^{nd}$ message including an indication indicating whether the M2M device should stop a bandwidth request process from the base station. More preferably, the M2M device may further include a processor, if the $2^{nd}$ message indicates not to stop the bandwidth request process, controlling a remaining bandwidth request to be performed.

To further achieve these and other advantages and in accordance with the purpose of the present invention, a base station, which receives a power outage report of an M2M (machine-to-machine) device in a wireless communication system, according to a further embodiment of the present invention may include a receiver configured to receive a $1^{st}$ message including a predefined bandwidth request (BR) index value from the M2M device having a power outage situation occurred therein, wherein the predefined BR index value is assigned to indicate that the power outage situation has occurred in the M2M device.

Advantageous Effects

According to various embodiments of the present invention, collision resolution between a base station and M2M devices can be prevents. Therefore, unnecessary power consumptions of the M2M devices can be reduced and efficiency of system resources can be considerably raised.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

Figure 1:
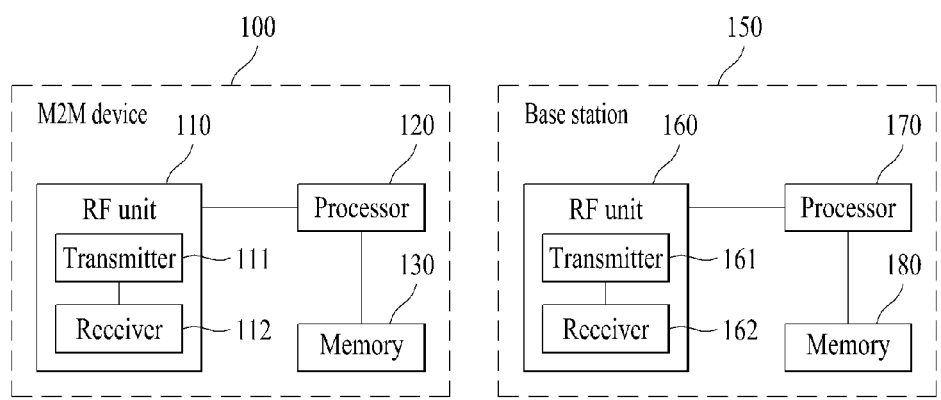
FIG. 1 is a schematic diagram for configurations of an M2M device and a base station according to one embodiment of the present invention.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. Detailed description disclosed together with the accompanying drawings is intended to explain not a unique embodiment of the present invention but an exemplary embodiment of the present invention. For instance, although the following descriptions are made in detail on the assumption that a mobile communication system includes IEEE (institute of electrical and electronics engineers) 802.16 system or 3GPP ($3^{rd}$ generation partnership project) system, they are applicable to other random mobile communication systems except unique features of IEEE 802.16 system or 3GPP system.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS), a machine-to-machine (M2M) device and the like. And, assume that a base station is a common name of such a random node of a network stage communicating with a terminal as a Node B, an eNode B, a base station (BS), an access point (AP) and the like.

In a mobile communication system, a mobile station (or user equipment) can receive information in downlink from a base station and transmit information in uplink to the base station. The informations transmitted or received by the mobile station may include data and various control informations. And, various kinds of physical channels may exist in accordance with types and usages of the informations transmitted or received by the mobile station.

First of all, embodiments of the present invention are usable for various radio access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in DL and SC-FDMA in UL. And, LTE-A (LTE-Advanced) is an evolved version of 3GPP LTE.

In the following description, an M2M communication may mean an information exchange performed between mobile stations or between a base station and each of mobile stations without human involvement. Hence, the M2M device may mean a mobile station capable of supporting the above-mentioned M2M device communication. An access service network for an M2M service may be defined as an M2M ASN (M2M access service network) and a network entity performing communications with M2M devices may be named an M2M server. In particular, the M2M server activates an M2M application and provides an M2M-specific service for at least one or more M2M devices. An M2M feature indicates a feature of an M2M application. And, at least one feature may be necessary to provide an application. An M2M device group may mean a group of M2M devices that share at least one common feature with each other.

The devices performing communications by M2M scheme may be variously named M2M devices, M2M communication devices, MTC (machine type communication) devices and the like. And, the number of the devices will increase gradually as the number of machine application types does. The currently discussed machine application types may include (1) security, (2) public safety, (3) tracking and tracing, (4) payment, (5) healthcare, (6) remote maintenance and control, (7) metering, (8) consumer device, (9) POS (Point Of Sales) and fleet Management in security related market, (10) M2M communication of vending machine (11) smart meter for plant and machinery remote monitoring, operating time measurement on measurement on construction plant and machinery and auto-measurement of consumed heat or electricity quantity on construction plant and machinery, (12) surveillance video communication and the like, by which the machine application types may be non-limited. And, there are ongoing discussions on other machine application types.

According to properties of M2M devices, the M2M device may have low mobility or no mobility. If a prescribed M2M device has considerably low mobility or does not have mobility at all, it may mean that the corresponding M2M device is stationary in the long term. An M2M communication system may be able to simplify or optimize mobility related operations for a specific M2M application related to such an M2M device having a stationary location as an M2M device for secured access and surveillance, an M2M device for public safety, an M2M device for payment, an M2M device for remote maintenance and control, an M2M device for metering and the like.

In the following description, an embodiment of the present invention is explained with reference to a case of applying M2M communication to a wireless communication system (e.g., IEEE 802.16e/m), by which the present invention may be non-limited. And, an embodiment of the present invention is applicable to such a different wireless communication system as 3GPP LTE system and the like in the same manner.

FIG. 1 is a schematic diagram for configurations of an M2M device and a base station according to one embodiment of the present invention.

Referring to FIG. 1, an M2M device 100, which may be named an M2M communication device but will be named as an M2M device in the following, may include an RF unit 110, a processor 120 and a memory 130. In this case, the memory 130 is an optional component. And, a base station 150 may include an RF unit 160, a processor 170 and a memory 180. In this case, the memory 180 is an optional component. The RF unit 110/160 may include a transmitter 111/161 and a receiver 112/162. For example of the M2M device 100, the transmitter 111 is configured to transmit signals to the base station 150 and other M2M devices. And, the receiver 112 is configured to receive signals from the base station 150 and other M2M devices. The process 120 performs various processings of a signal to transmit and then transfers the processed signal to the transmitter 111. And, the processor 120 may process a signal received by the receiver 112. If necessary, the processor 120 may control information contained in an exchanged message to be saved in the memory 130. The above-configured M2M device 100 may perform various methods according to embodiments of the present invention mentioned in the following description.

Besides, the M2M device 100 may further include various kinds of additional components (not shown in FIG. 1) according to its machine application type. In case that the corresponding M2M device 100 is provided for the smart meter, it may further include an additional configuration for power measurement and the like. This power measuring operation may be under the control of the processor 120 shown in FIG. 1 or a separately configured processor (not shown in the drawing).

Although FIG. 1 shows a case that a communication is performed between the M2M device 100 and the base station 150 for example, an M2M communication method according to the present invention may be performed between M2M devices. In particular, each of the M2M devices may have the same device configurations shown in FIG. 1 to perform various methods according to embodiments of the present invention mentioned in the following description.

The transmitter 161 of the base station 150 is configured to transmit signals to another base station, an M2M server and M2M devices. And, the receiver 162 of the base station 150 is configured to receive signals from another base station, an M2M server and M2M devices. The process 170 is functionally connected to each of the transmitter 161 and the receiver 162 to control a process for the transmitter 161 and the receiver 162 to transceive signals with other devices. The processor 170 performs various kinds of processings on a signal to transmit and then transfers the processed signal to the transmitter 161. And, the processor 170 may be able to perform processing on a signal received by the receiver 162. If necessary, the processor 170 may control information contained in an exchanged message to be saved in the memory 180. The above-configured base station 150 may perform various methods according to embodiments of the present invention mentioned in the following description.

The processor 120 of the M2M device 100 directs operations (e.g., control, adjustment, management, etc.) in the M2M device 100. The processor 170 of the base station directs operations (e.g., control, adjustment, management, etc.) in the base station 150. The processor 120/170 may be connected to the memory 130/180 configured to store program codes and data. The memory 130/180 is connected to the processor 120/170 to store operating systems, applications and general files.

The processor 120/170 may be named one of a controller, a microcontroller, a microprocessor, a microcomputer and the like. Moreover, the processor 120/170 may be implemented by hardware, firmware, software or a combination thereof. In case of implementing an embodiment of the present invention using hardware, the processor 120/170 may be provided with such a configuration to perform the present invention as ASICs (application specific integrated circuits), DSPs (digital signal processors), DSPDs (digital signal processing devices), PLDs (programmable logic devices), FPGAs (field programmable gate arrays), and the like.

In case of implementing embodiments of the present invention using firmware or software, the firmware or software may be configured to include modules, procedures, and/or functions for performing the functions or operations of the present invention. And, the firmware or software configured to perform the present invention may be driven by the processor 120/170 in a manner of being installed at the processor 120/170 or being saved in the memory 130/180.

In the following description, an idle mode is the mode for operating a paging group, a paging cycle and a paging offset, which are granted by a base station, through signaling between a mobile station and a base station in order to save a power of the mobile station (e.g., M2M device, etc.). In particular, although a mobile station roams a radio link environment in which a plurality of base station exists across a wide area, the mobile station performs a mechanism for receiving a downlink broadcast message periodically without registering at a specific base station.

In the idle mode, all normal operations are stopped as well as a handover (HO) and downlink synchronization is coordinated to receive a paging message, which is a kind of a broadcast message, in a predetermined interval only. In this case, the paging message is the message that gives an instruction of a paging action to a mobile station. For instance, the paging operation may include one of a ranging operation, a network reentry and the like.

The idle mode can be initiated by a mobile station or a base station. In particular, the mobile station sends a deregistration request message (e.g., AAI-DREG-REQ message) to a base station and then receives a deregistration response message (e.g., AAI-DREG-RSP) from the base station in response to the deregistration request message, thereby entering the idle mode. Moreover, if the base station sends a non-requested deregistration response message or a deregistration command message (e.g., AAI-DREG-CMD message) to the mobile station, the mobile station can enter the idle mode.

In case that a mobile station receives a paging message corresponding to itself for an available interval (AI), the mobile station switches to a connected mode through a network entry process with a base station and then transceives data. An idle state operation or an idle mode operation generally means an operation of supporting a mobile station to periodically perform a downlink broadcast traffic transmission without registering at a specific base station in case of moving away into a radio link environment configured with multiple base stations. In case of failing to receive traffic for predetermined duration, the mobile station can make a transition to an idle state to save a power. Having made the transition to the idle mode, the mobile station receives a broadcast message (e.g., a paging message) broadcasted by the base station for the available interval (AI) and is then able to determine whether to make a transition to a normal mode or stay in the idle state.

An idle state can give a benefit to a mobile station by removing an activation request related to a handover and general operation requests. The idle state puts restriction in a manner that mobile station activity is scanned in a discrete period, whereby a power and operating resources used by the mobile station can be saved. The idle state provides a simple and appropriate scheme for informing a mobile station of a downlink traffic in pending and removes a radio interface and a network handover (HO) traffic from an inactive mobile station, thereby giving benefits to a network and a base station.

Paging means a function of obtaining a location (e.g., a prescribed base station, a prescribed switching station, etc.) of a corresponding mobile station in case of an occurrence of an incoming signal in a mobile communication. A multitude of base station supportive of an idle state or an idle mode can configure a paging region by belonging to a specific paging group. In this case, a paging group indicates a logical group. The object of the paging group is to provide an adjacent range region that can be paged in downlink. Preferably, the paging group is configured to meet a condition that the paging group is large enough for a specific mobile station to exist for most of time within the same paging group and a condition that the paging group is small enough for a paging load to maintain an appropriate level.

A paging group can include at least one base station. And, one base station can be included in one or more paging groups. The paging group is defined by a management system. A paging group-action backbone network message is usable in a paging group. Moreover, a paging controller can manage a list of mobile stations in an idle state using a paging-announce message corresponding to one of backbone network messages and is also able to manage an initial paging of every base station belonging to a paging group.

For clarity of the following description, various embodiments of the present invention are described with reference to IEEE 802.16e/16 m/16p system, by which the technical idea of the present invention may be non-limited. The present invention proposes various embodiments for reducing an unnecessary contention resolution process of M2M device.

Table 1 in the following is the table that shows informations masked on A-MAP IE in IEEE 802.16m system. The A-MP IE indicates a control information transmitted to a mobile station by a base station in IEEE 802.16m system.

TABLE 1

| Masking Prefix (1 bit MSB) | | Remaining 15 bit LSBs |
|---|---|---|
| | Type Indicator | Masking Code |
| 0b0 | 0b000 | 12 bit STID or TSTID |
| | 0b001 | Refer to Table 850 |
| | 0b010 | Refer to Table 851 |
| 0b1 | | 15-bit RA-ID: The RA-ID is derived from the AMS's random access attributes [i.e., superframe number (LSB 5 bits), frame_index (2 bits), preamble code index for ranging or BR (6 bits) and opportunity index for ranging or BR (2 bits)] as defined below: RA-ID = (LSB 5 bits of superframe number\|frame_index\|preamble_code_index\|opportunity_index) |

Referring to Table 1, if a type indicator is 000, it indicates that 12-bit STID or temporary STID (TSTID) information is masked.

Table 2 in the following is the table for description of a masking code for the type indicator 001 shown in Table 1.

TABLE 2

| Decimal value | Description |
|---|---|
| 0 | Used to mask Broadcast Assignment A-MAP IE for broadcast or ranging channel assignment |
| 1 | Used to mask BR-ACK A-MAP IE |
| 2-128 | Used to mask Group Resource Allocation A-MAP IE (group ID) |
| Others | Reserved |

Referring to Table 2, when a type indicator is 001, a masking code value (decimal value) 1 is the value used to mask BR-ACK A-MAP IE. And, masking code values (decimal values) 2 to 128 are the values used to mask group resource allocation A-MAP IE.

Table 3 in the following is the table for the description of the masking code for the type indicator '01' shown in Table 1.

TABLE 3

| Decimal value | Description |
|---|---|
| 4095 | Used to mask Broadcast Assignment A-MAP IE for multicast assignment |
| Others | Reserved |

Referring to Table 3, when the type indicator is 010, a masking code value (decimal value) 4095 can be used to mask broadcast assignment A-MAP IE for multicast assignment.

In the following description, in case that an involuntary power outage or an abnormal power outage occurs in an M2M device, general operations between the M2M device and a base station for a report transmission for the involuntary power outage situation and the like are explained in brief.

First of all, regarding an operation of an M2M device, if an involuntary power outage occurs, the M2M device can transmit a power outage report indicator to a base station in order to notify a power outage situation. In case that a connected mode M2M device, in which the power outage has occurred, receives a power outage contention BR stop indicator or a ranging stop indicator before making a contention bandwidth request (BR) for a power outage report, a processor 120 of the M2M device does not make the contention BR but is able to control the M2M device to wait for receiving a polling for the power outage report from the base station for a specific time.

Meanwhile, after a connected mode M2M device, in which the power outage has not occurred, has received a power outage contention BR or a ranging stop indicator, if the power outage occurs, the processor 120 of the M2M device does not make the contention BR instantly but is able to control the M2M device to wait for receiving a polling for the power outage report from the base station for a specific time. However, if the poling is not received for the specific time, the M2M device receives allocation of a resource through a contention based BR or ranging and is then able to report the power outage situation using the allocated resource. On the contrary, if the power outage occurring M2M device receives the polling from the base station, the M2M device can transmit a power outage information to the base station using the corresponding resource.

Secondly, an operation of a base station is described in brief as follows. If a base station receives a power outage report indicator from at least one M2M device, the base station can transmit a power outage contention BR stop indicator/ranging stop indicator (hereinafter named PCS indicator, by which the power outage contention BR stop indicator/ranging stop indicator may be non-limited) to the corresponding M2M device. Having transmitted the PCS indicator, the base station can poll mobile stations in connected mode. In doing so, an individual resource allocation or a group resource allocation is available. And, the power outage polling is possible in a different frame as well as in the same frame.

A PCS indicator used by the present invention indicates an information that is transmitted by a base station to power-outage M2M devices in a cell in order to block indiscrete random accesses (e.g., contention BR, contention ranging, etc.) for the power outage occurring M2M devices to report the power outages or in order to delay the random access for a predetermined time. Such a name uses the PCS indicator to facilitate the corresponding comprehension for example and can use different names other than the PCS indicator. For instance, such an indicator can be named a power outage random access deferment indicator (PRD indicator) or the like.

The present invention shall propose various types of a method for a base station to deliver such a PCS indicator to an M2M device depending on a timing, a signaling scheme and the like, which may be non-limited by the examples of the present invention. As proposed by the examples of the present invention, a signal received from an M2M device to enable a base station to send a PCS indicator may include one of various types depending on a timing or method for the M2M device to transmit the signal, which may be non-limited by the examples of the present invention.

In order to facilitate the comprehension of the present invention, embodiments are sorted in a manner of discriminating an idle mode M2M device from a connected mode M2M device. And, each method may be applicable irrespective of an M2M device in idle mode or an M2M device in connected mode. In order for power-outage occurring M2M devices in a cell to receive a PCS indicator, a base station can transmit the PCS indicator by multicast or broadcast.

A power outage report indicator transmitted by an M2M device and a PCS indicator transmitted by a base statin can be sorted by the followings.

Power Outage Indicator or Power Outage Report Indicator

M2M device can transmit a power outage indicator, which indicates a power outage situation, to a base station using a specific ranging code or a ranging opportunity. To this end, the base station can assign a specific ranging code for a usage of a power outage indicator. And, the M2M device can perform a power outage report by transmitting a ranging code, which is assigned and designed for a case of an occurrence of a power outage, to the base station. On the other hand, the base station can assign a dedicated ranging opportunity instead of the ranging code. Alternatively, the base station may assign a dedicated ranging code and a ranging opportunity for the purpose of a power outage indicator.

M2M device can transmit a power outage indicator to a base station using a ranging request message (e.g., AAI-RNG-REQ message). In a ranging process, the M2M device can inform the base station of a power outage situation in a manner of assigning a ranging object of the ranging request message as a power outage. Yet, the M2M device adds a power outage indicator instead of assigning the ranging object as the power outage and is then able to transmit the corresponding power outage to the base station.

Meanwhile, in IEEE 802.16m system for example of a mobile communication system, an M2M device can transmit a power outage report indicator using a 5-step dedicated BR preamble sequence. To this end, the base station assigns a BR preamble sequence for a usage of a power outage. If the power outage occurs, the M2M device can transmit a power outage indicator to the base station using the BR preamble sequence for the usage of the power outage. Yet, this content may apply to a connected mode M2M device only.

On the other hand, an M2M device can transmit a power outage indicator to a base station in a 3-step bandwidth request process using a quick access message (i.e., BR index is assigned for the power outage usage). To this end, the base station can assign a specific BR index for a power outage usage.

PCS Indicator

When an initial ranging is performed, a base station can transmit a PCS indicator to an M2M device in response to a CDMA ranging request using an AAI-RNG-ACK message. When the base station sends the AAI-RNG-ACK message for a ranging code, the PCS indicator is included in the corresponding message. In doing so, the AAI-RNG-ACK message can be sent by broadcast or multicast.

Moreover, when a base station sends a CDMA allocation MAP IE message to an M2M device, a PCS indicator can be included in the corresponding message. In doing so, the CDMA allocation MAP IE message can be sent by broadcast or multicast.

Meanwhile, when a base station receives a power outage indicator from an M2M device through a 5-step BR code or 3-step quick access message, the base station can send a BR-ACK A-MAP IE message to the M2M device in response to the received message in a manner that a PCS indicator is included in the corresponding message. In this case, the BR-ACK A-MAP IE message is the message for indicating a decoding state of a transmitted BR preamble sequence. In doing so, the BR-ACK A-MAP IE message can be sent by broadcast or multicast.

M2M device can send a ranging request message (e.g., AAI-RNG-REQ message) to a base station in a manner that a power outage indicator indicating a power outage situation is included in the corresponding message. In response to the ranging request message, the base station can send a ranging response message (e.g., AAI-RNG-RSP message) to the M2M device in a manner that a PCS indicator is included in the corresponding message. In doing so, the ranging response message can be sent by broadcast or multicast.

Meanwhile, a base station can use a new MAC message including a PCS indicator or a MAC header (e.g., a signaling header, an extended header, etc.) including a PCS indicator. In doing so, the new MAC message can be sent by broadcast or multicast. In the present invention, the new MAC message is named an AAI-M2M-PO-IND message for example and shall be described in detail later.

Moreover, a base station can transmit a PCS indicator to an M2M device using a downlink control channel such as a super frame header (SFH) or a non-user-specific A-MAP IE/extended non-user-specific A-MAP IE (NUS A-MAP IE/extended NUS A-MAP IE) message. If the base station receives a power outage indicator from the M2M device by the same method as mentioned in the foregoing description, the base station can transmit the PCS indicator to the M2M device through the super frame header, the NUS A-MAP IE message or the extended NUS A-MAP IE message in response to the received power outage indicator.

In order to support the power outage indicator and the PCS indicator, it is necessary to partially amend a message format in the conventional IEEE 802.16m system. It is necessary to reserve BR and ranging codes for a power outage report for an M2M device currently operating in connected mode. If a power outage occurs in M2M device, a connected mode M2M device transmits an indicator (e.g., a BR code for a power outage indicator) for the power outage report to a base station and an M2M device currently operating in idle mode can transmit a ranging code for the power outage report.

Figure 2:
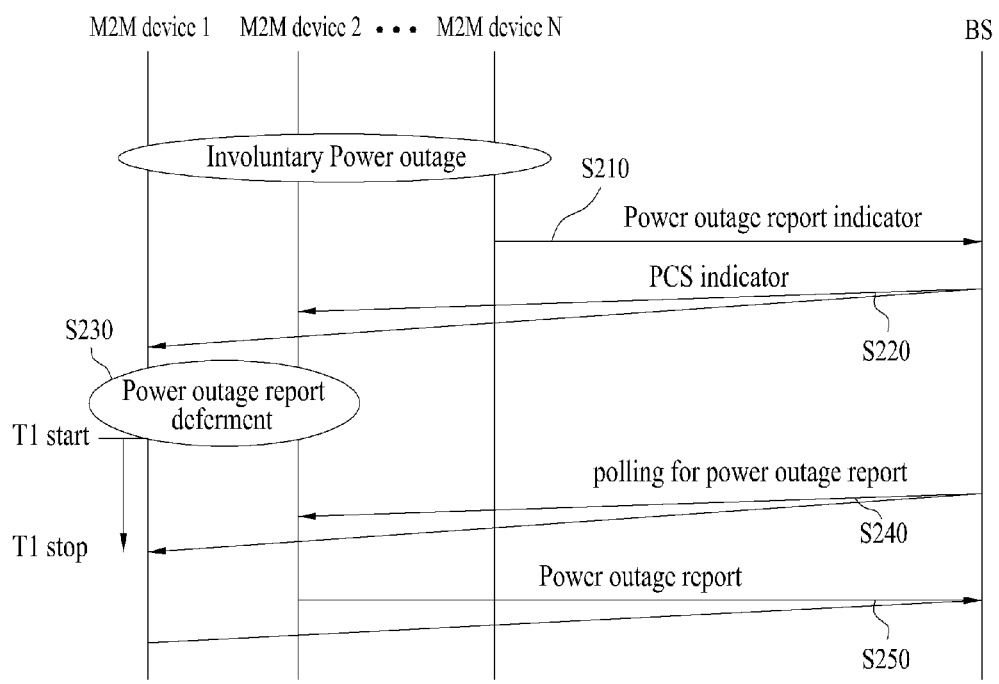
FIG. 2 is a diagram for one example to describe a process for M2M devices to perform communications with a base station in case of occurrence of a power outage.

FIG. 2 is a diagram for one example to describe a process for M2M devices to perform communications with a base station in case of occurrence of a power outage.

Referring to FIG. 2, assume that involuntary power outage occurs in M2M devices (e.g., M2M device 1, M2M device 2, . . . , M2M device N). A base station can receive a power outage indicator or a power outage report indicator from at least one (e.g., M2M device N) of the M2M devices having the involuntary power outage occurred therein through a BR code for a power outage report, a ranging code for the power outage report or the like [S210].

If so, a processor 170 of the base station determines that the involuntary power outage has occurred in the at least one M2M device in a corresponding cell and is then able to transmit a PCS indicator to the rest (e.g., M2M device 1, M2M device 2, etc.), which fail in transmitting the involuntary power outage indicator, of the M2M devices in the cell [S220]. In this case, as mentioned in the foregoing description, the PCS indicator may include a power outage contention BR or ranging stop indicator and can be transmitted by multicast or broadcast.

Having received the PCS indicator from the base station, each of the M2M devices (e.g., M2M device 1, M2M device 2, etc.) defers a report for the power outage situation and waits for receiving a polling for the power outage report from the base station [S230]. This waiting may continue for a time value of a specific timer.

Thereafter, if each of the M2M devices (e.g., M2M device 1, M2M device 2, etc.) receives the polling for the power outage report from the base station [S240], the corresponding M2M device (e.g., M2M device 1, M2M device 2, etc.) can transmit the power outage report to the base station through a corresponding resource allocated by the polling [S250]. Through a series of these steps, it is able to efficiently solve the collision problem caused by the power outage report transmission due to the involuntary power outage.

Meanwhile, if the base station receives a power outage indicator or a power outage report indicator from at least one (e.g., M2M device N) of the involuntary power outage occurring M2M devices via a BR code for the power outage report, a ranging code for the power outage report or the like, the processor 170 of the base station determines that the involuntary power outage has occurred in at least one M2M device in the corresponding cell and is then able to send an AAI-RNG-ACK message for the corresponding power outage report ranging code in order to reduce the collision resolution process. If the base station receives the ranging code for the power outage report from the corresponding M2M device, the base station can send an AAI-RNG-ACK message including the PCS indicator to the M2M devices by broadcast or multicast in order for the power outage occurring M2M devices to receive the corresponding PCS indicator. If the AAI-RNG-ACK message is sent by multicast, the base station can assign a multicast identifier (ID) for the PCS indicator. For the transmission via the AAI-RNG-ACK message, the base station can perform the transmission in a manner that the multicast ID is included in the corresponding MAP IE or that multicast ID is masked with CRC (cyclic redundancy check). Thereafter, the processor 120 of each of the involuntary power outage occurring M2M devices may attempt AAI-RNG-ACK message decoding using the corresponding multicast ID.

In the following description, a method of assigning a multicast ID for indicating a power outage indicator in IEEE 802.16m system is explained in brief. Table 4 is provided to describe a masking code for a type indicator 001.

TABLE 4

| Decimal Value | Description |
|---|---|
| 0 | Used to mask Broadcast Assignment A-MAP IE |
| 1 | Used to mask BR-ACK A-MAP IE |
| 2-128 | Used to mask Group Resource Allocation A-MAP IE (group ID) |
| 129 | Used to mask Broadcast Assignment A-MAP IE for power outage random access stop indicator |
| 130-4095 | Reserved |

Referring to Table 4, when a type indicator is set to 001 in Table 1, masking code values #2 to #128 may be used to mask broadcast assignment A-MAP IE, a masking code value #1 is assigned for BR-ACK A-MAP IE, and a masking code value #0 is assigned for group resource allocation A-MAP IE (GRA A-MAP IE). These values are provided for general mobile stations used not for M2M communications but for human-to-human communications. $130^{th}$ to $212^{th}$ masking code values (or IDs) (i.e., masking code values #129 to #211) may not be used for general mobile stations. And, a portion of them, e.g., the masking code value #129, may be assigned as a multicast ID used to mask the broadcast assignment A-MAP IE for a power outage random access stop indicator.

Table 5 is provided to describe a masking code for a type indicator 010.

TABLE 5

| Decimal Value | Description |
|---|---|
| 4094 | Used to mask Broadcast Assignment A-MAP IE for power outage random access stop indicator |
| 4095 | Used to mask Broadcast Assignment A-MAP IE for multicast assignment |
| others | Reserved |

Referring to Table 5, when a current type indicator is set to 010 in Table 1, a masking code value #4094 may be assigned to be used to mask a broadcast assignment A-MAP IE for a power outage random access stop indicator and a masking code value #4095 may be used to mask a broadcast assignment A-MAP IE for multicast assignment.

A base station can send an AAI-RNG-ACK message including a power outage random access stop indicator to an M2M device. The power outage random access stop indicator means the indicator that instructs a power outage occurring M2M device not to initiate a random access directly but to stand by. To this end, the base station can transmit a predetermined masking code value of 4094, for example, to the M2M device in a manner that the masking code value is masked with a CRC of a broadcast assignment A-MAP IE. If so, the processor 120 of the M2M device decodes the masking code value masked with the CRC of the broadcast assignment A-MAP IE and can recognize that the corresponding broadcast assignment A-MAP IE is provided for the power outage random access stop indicator.

Table 6 shows one example of AAI-RNG-ACK message format.

TABLE 6

| Field | Size | Value/Description |
|---|---|---|
| If (transmitted in a DL resource allocated by Broadcast assignment A-MAP IE) { | | |
| . | | . |
| power outage contention BR/ranging stop (PCS) indicator | 1 | 1: Indicating that contention BRs or random access processes are deferred for a specific period or stopped. |
| } else if (transmitted in a DL resource allocated by DL basic assignment A-MAP IE) { | | |

Referring to Table 6, a base station can transmit a PCS indicator field to and M2M device in a manner that the PCS indicator field is included in an AAI-RNG-ACK message. For instance, if a PCS indicator value is set to 1, it indicates that contention BR or ranging of each of power outage occurring M2M devices is deferred for a specific period or stopped. The processor 120 of the M2M device decodes an indication value of the PCS indicator and is able to stop to defer a contention BR or ranging transmission for a specific period.

Figure 3:
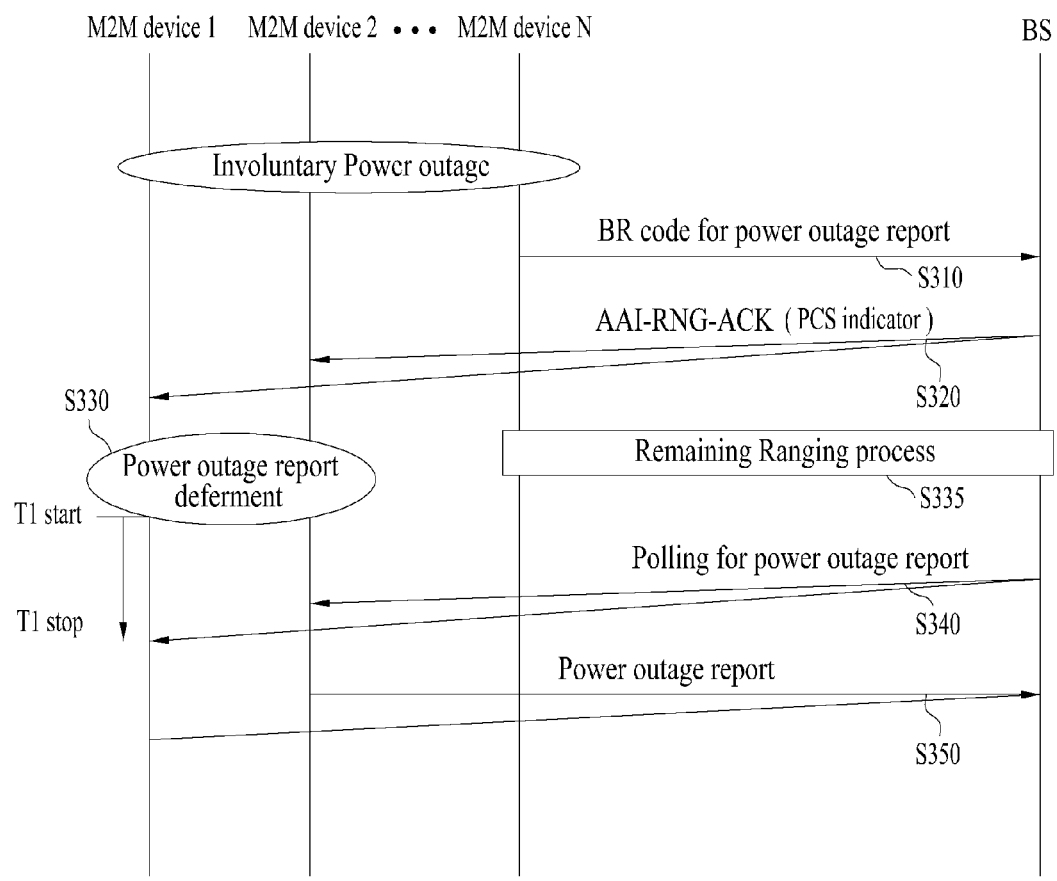
FIG. 3 is a diagram for another example to describe a process for M2M devices to perform communications with a base station in case of occurrence of a power outage.

FIG. 3 is a diagram for another example to describe a process for M2M devices to perform communications with a base station in case of occurrence of a power outage.

According to the present embodiment, assume that involuntary power outage occurs in M2M devices (e.g., M2M device 1, M2M device 2, . . . , M2M device N). A base station can receive a power outage indicator or a power outage report indicator from at least one (e.g., M2M device N) of the M2M devices having the involuntary power outage occurred therein through a ranging code for the power outage report or the like [S310].

If so, a processor 170 of the base station determines that the involuntary power outage has occurred in the at least one M2M device in a corresponding cell and is then able to transmit a PCS indicator to the rest (e.g., M2M device 1, M2M device 2, etc.), which fail in transmitting the involuntary power outage indicator, of the M2M devices in the cell through an AAI-RNG-ACK message for example [S320]. In this case, as mentioned in the foregoing description, the PCS indicator may include a ranging stop indicator or a power outage contention BR stop indicator and can be transmitted by multicast or broadcast.

Each processor 120 of the M2M devices (e.g., M2M device 1, M2M device 2, . . . , M2M device N) attempts AAI-RNG-ACK message decoding. If the AAI-RNG-ACK message including the PCS indicator is received before attempting a random access, the processor 120 can control an initiation of a random access process to be deferred for a specific time [S330].

Thereafter, if each of the M2M devices (e.g., M2M device 1, M2M device 2, etc.), which fail in reporting the power outage occurrence, receives a polling for the power outage report from the base station [S340], the corresponding M2M device can transmit a power outage report including a presence or non-presence of a power outage and the like to the base station through a corresponding resource allocated by the polling [S350].

Meanwhile, after receiving the AAI-RNG-ACK message from the base station [S320], the M2M device N having transmitted the BR or ranging code for the power outage report in the step S310 can perform a ranging process (or a network entry or location update process) corresponding to itself [S335].

When a power outage occurs, an M2M device can report the occurrence of the power outage to a base station using a specific ranging code. Alternatively, the M2M device transmits a normal ranging code to the base station and is then able to report the power outage to the base station through a ranging request message (e.g., AAI-RNG-REQ message). In particular, the M2M device can send the AAI-RNG-REQ message to the base station in a manner that an indicator indicating the occurrence of an involuntary power outage is included in the corresponding message [e.g., a specific value of a ranging object field can be additionally assigned for the corresponding purpose].

Having received the AAI-RNG-REQ message from the M2M device, the base station sends an AAI-RNG-RSP message in response to the received message. In doing so, a PCS indicator can be transmitted in a manner of being contained in the AAI-RNG-RSP message. In order for all of the power outage occurring M2M devices to receive the AAI-RNG-RSP message, the base station can send the AAI-RNG-RSP message by multicast or broadcast. If receiving the PCS indicator from the base station before a random access, the processor 120 of the involuntary power outage occurring M2M device can control an initiation of a random access process to be deferred for a specific period or stopped.

Table 7 shows one example of a ranging response message (e.g., AAI-RNG-RSP message) format including a PCS indicator.

TABLE 7

| Field | Size | Value/Description |
|---|---|---|
| ... | ... | ... |
| power outage contention BR/ranging stop (PCS) indicator | 1 | 1: Indicating that contention BRs or random access processes are deferred for a specific period or stopped. |
| ... | ... | ... |

Referring to Table 7, a base station can transmit a PCS indicator to an M2M device in a manner that the PCS indicator is included in an AAI-RNG-RSP message. If an indicator value of the PCS indicator indicates that contention BRs or random access processes are deferred for a specific period or stopped, the processor 120 of the corresponding M2M device can control the contention BR or the random access process to be deferred for a specific period or stopped.

Figure 4:
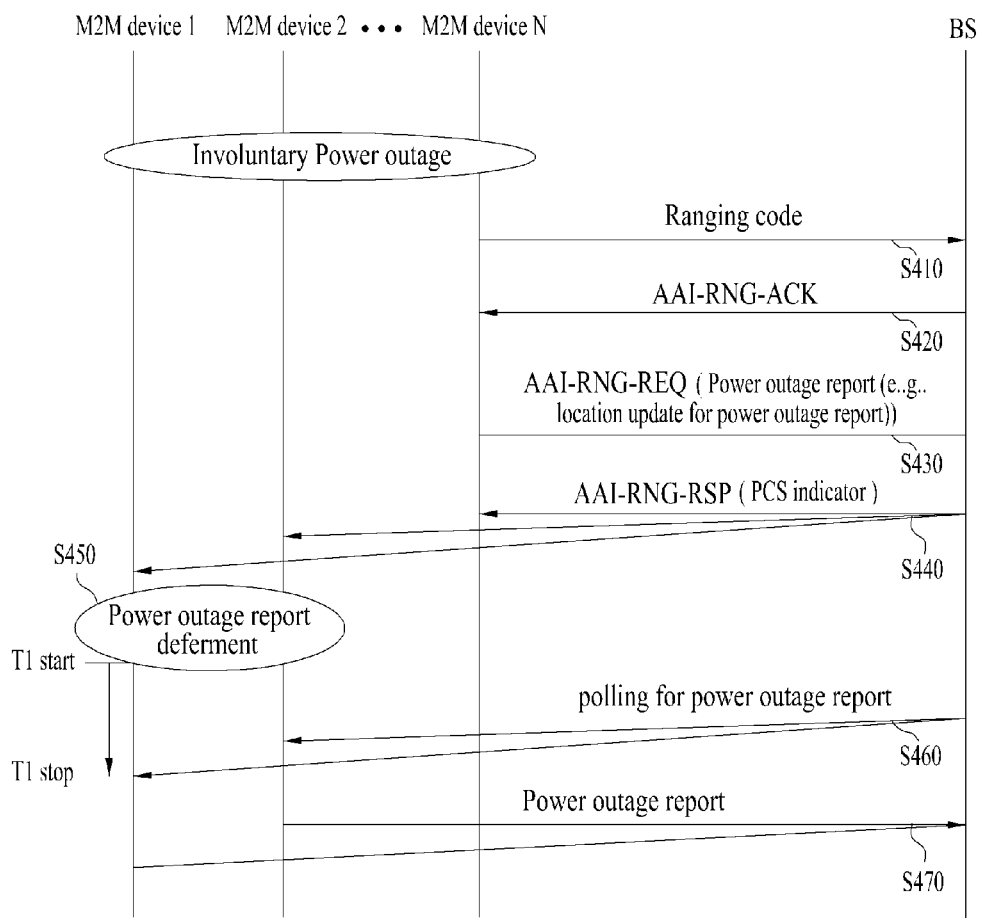
FIG. 4 is a diagram for another example to describe a process for M2M devices to perform communications with a base station in case of occurrence of a power outage.

FIG. 4 is a diagram for another example to describe a process for M2M devices to perform communications with a base station in case of occurrence of a power outage.

According to the present embodiment, assume that involuntary power outage occurs in M2M devices (e.g., M2M device 1, M2M device 2, . . . , M2M device N).

Referring to FIG. 4, the involuntary power outage occurring M2M device N can transmit a normal ranging code to a base station [S410]. In response to the normal ranging code, the M2M device N can receive an AAI-RNG-ACK message from the base station [S420]. Thereafter, the M2M device N can transmit a power outage report for the involuntary power outage occurrence to the base station through a ranging request message (e.g., AAI-RNG-REQ message) [S430]. If the base station receives a power outage indicator or a power outage report indicator from at least one (e.g., M2M device N) of the M2M devices having the involuntary power outage occurred therein [S430], a processor 170 of the base station determines that the involuntary power outage has occurred in the at least one M2M device in a corresponding cell and is then able to transmit a PCS indicator to the rest (e.g., M2M device 1, M2M device 2, etc.), which fail in transmitting the involuntary power outage indicator, of the M2M devices in the cell as well as to the M2M device N using an AAI-RNG-RSP message for example [S440].

In this case, the PCS indicator may include a power outage contention BR or ranging stop indicator and can be transmitted by multicast or broadcast. In case that the base station transmits the PCS indicator by multicast, a multicast ID for a power outage may be reserved in advance. And, this multicast ID can be used in A-MAP IE for sending AAI-RNG-RSP message in order for the power outage occurring M2M devices to decode the A-MAP IE.

The processor 120 of each of the M2M devices (e.g., M2M device 1, M2M device 2) failing in making the power outage report attempts the AAI-RNG-RSP message decoding. If receiving the AAI-RNG-RSP message including the PCS indicator before attempting a random access, the processor 120 can control an initiation of a random access process to be deferred for a specific time [S450].

Thereafter, if each of the M2M devices (e.g., M2M device 1, M2M device 2, etc.), which fail in reporting the power outage occurrence yet, receives a polling for the power outage report from the base station [S460], the corresponding M2M device can transmit a power outage report including a presence or non-presence of a power outage and the like to the base station through a corresponding resource allocated by the polling [S470].

According to the embodiment described with reference to FIG. 4, the base station uses the AAI-RNG-RSP message to transmit the PCS indicator. Yet, it is able to transmit the PCS indicator as a new broadcast or multicast message different from the AAI-RNG-RSP message. Table 8 shows a new M2M power outage indication message (e.g., AAI-M2M-PO-IND message) including a PCS indicator.

TABLE 8

| Field | Size | Value/Description |
|---|---|---|
| ... | ... | ... |
| power outage contention BR/ranging stop (PCS) indicator | 1 | 1: Indicating that contention BRs or random access processes are deferred for a specific period or stopped. |
| ... | ... | ... |

Referring to Table 8, in case that a base station transmits a PCS indicator in a manner that the PCS indicator is included in an AAI-M2M-PO-IND message, an AAI-RNG-RSP message can be transmitted by unicast or initial ranging without including the PCS indicator. This AAI-M2M-PO-IND message can carry a power outage indicator by multicast/broadcast instead of the AAI-RNG-RSP message. Like the above-mentioned example, when an M2M device transmits a power outage information to a base station through a ranging code, the base station can transmit the AAI-M2M-PO-IND including a PCS indicator to the M2M device instead of transmitting an AAI-RNG-ACK message including the PCS indicator. In this case, it is advantageous in that the AAI-RNG-ACK message or the AAI-RNG-RSP message needs not to be amended.

Figure 5:
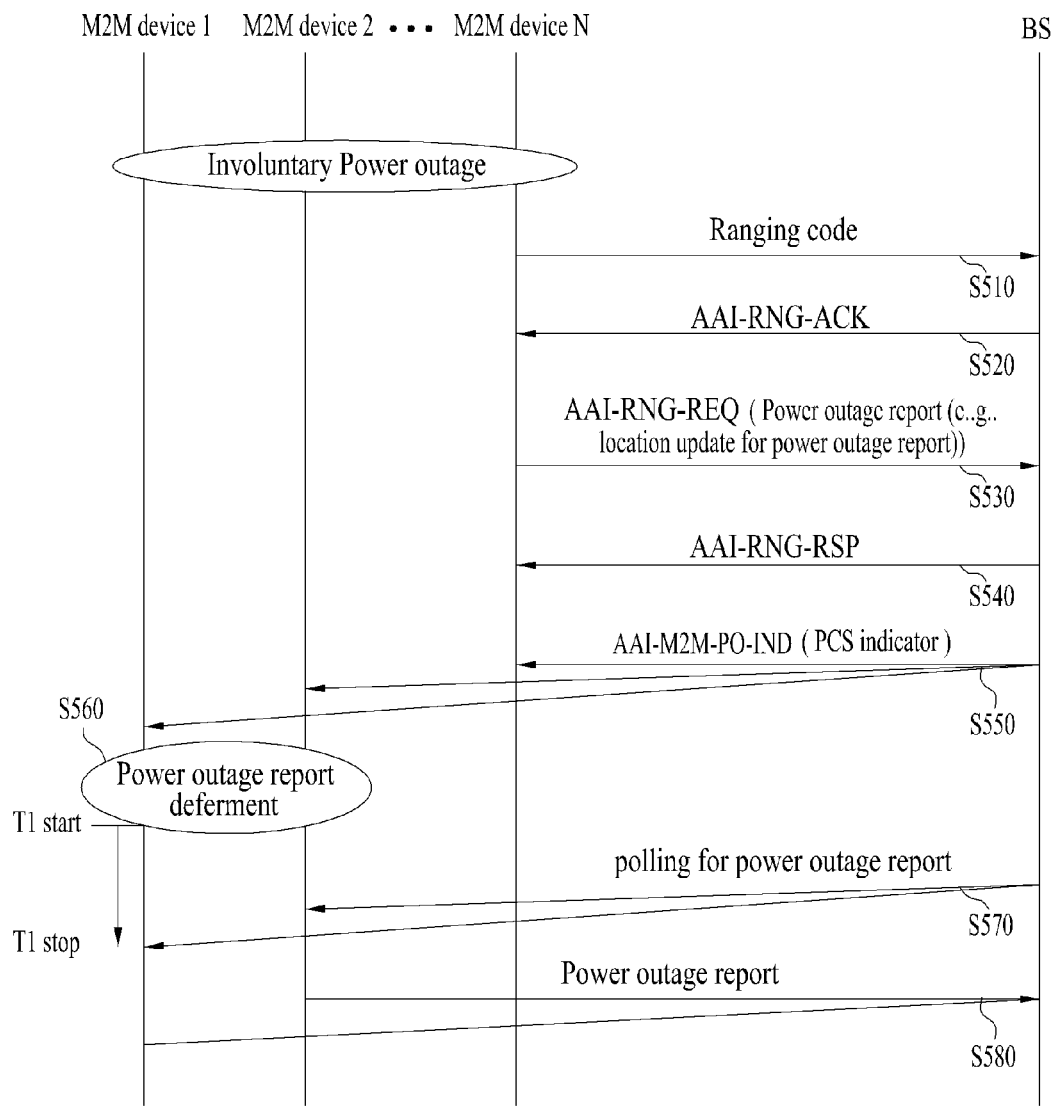
FIG. 5 is a diagram for another example to describe a process for M2M devices to perform communications with a base station in case of occurrence of a power outage.

FIG. 5 is a diagram for another example to describe a process for M2M devices to perform communications with a base station in case of occurrence of a power outage.

According to the present embodiment, assume that involuntary power outage occurs in M2M devices (e.g., M2M device 1, M2M device 2, . . . , M2M device N).

Referring to FIG. 5, the M2M device N can transmit a normal ranging code to a base station [S510]. In response to the normal ranging code, the M2M device N can receive an AAI-RNG-ACK message from the base station [S520]. Thereafter, the M2M device N can transmit a power outage report for the involuntary power outage occurrence to the base station through a ranging request message (e.g., AAI-RNG-REQ message) [S530]. In response to the ranging request message, the base station sends a ranging response message to the M2M device N [S540].

If the base station receives a power outage indicator or a power outage report indicator from at least one (e.g., M2M device N) of the M2M devices having the involuntary power outage occurred therein [S530], a processor 170 of the base station determines that the involuntary power outage has occurred in the at least one M2M device in a corresponding cell and is then able to transmit a PCS indicator to the rest (e.g., M2M device 1, M2M device 2, etc.), which fail in transmitting the involuntary power outage indicator, of the M2M devices in the cell as well as to the M2M device N using an AAI-M2M-PO-IND message for example [S550]. In this case, the PCS indicator may include a power outage contention BR or ranging stop indicator and can be transmitted by multicast or broadcast.

The processor 120 of each of the M2M devices (e.g., M2M device 1, M2M device 2) failing in making the power outage report attempts the AAI-M2M-PO-IND message decoding. If receiving the AAI-M2M-PO-IND message including the PCS indicator before attempting a random access, the processor 120 can control an initiation of a random access process to be deferred for a specific time or stopped [S560].

Thereafter, if each of the M2M devices (e.g., M2M device 1, M2M device 2, etc.), which fail in reporting the power outage occurrence yet, receives a polling for the power outage report from the base station [S570], the corresponding M2M device can transmit a power outage report including a presence or non-presence of a power outage and the like to the base station through a corresponding resource allocated by the polling [S580].

Through a non-user specific A-MAP IE (NUS A-MAP IE) or an extended non-user specific A-MAP IE (extended NUS A-MAP IE) (in this case, an extended flag of the NUS A-MAP IE is set to 1), which is one of downlink control channels in IEEE 802.16m system, a base station can transmit PCS indicator to M@M devices. If receiving the PCS indicator via the NUS A-MAP IE or the extended non-user specific A-MAP IE, the processor 120 of the M2M device controls an initiation of a random access (ranging or contention BR) process to be deferred or stopped for a specific period.

Moreover, the base station can transmit the PCS indicator to the M2M device not through the downlink control channel but through a broadcast channel (e.g., a super frame header (SFH IE).

Figure 6:
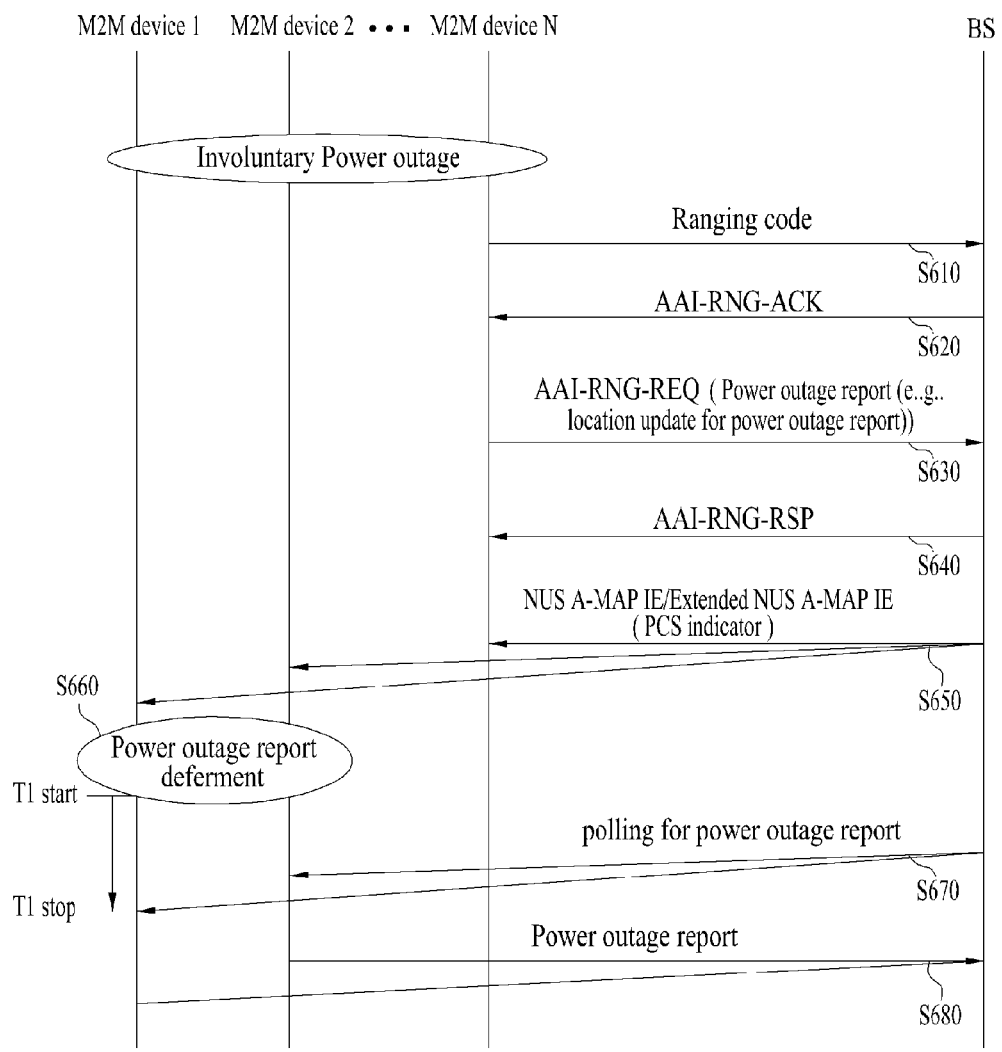
FIG. 6 and FIG. 7 are diagrams for another example to describe a process for M2M devices to perform communications with a base station in case of occurrence of a power outage.
Figure 7:
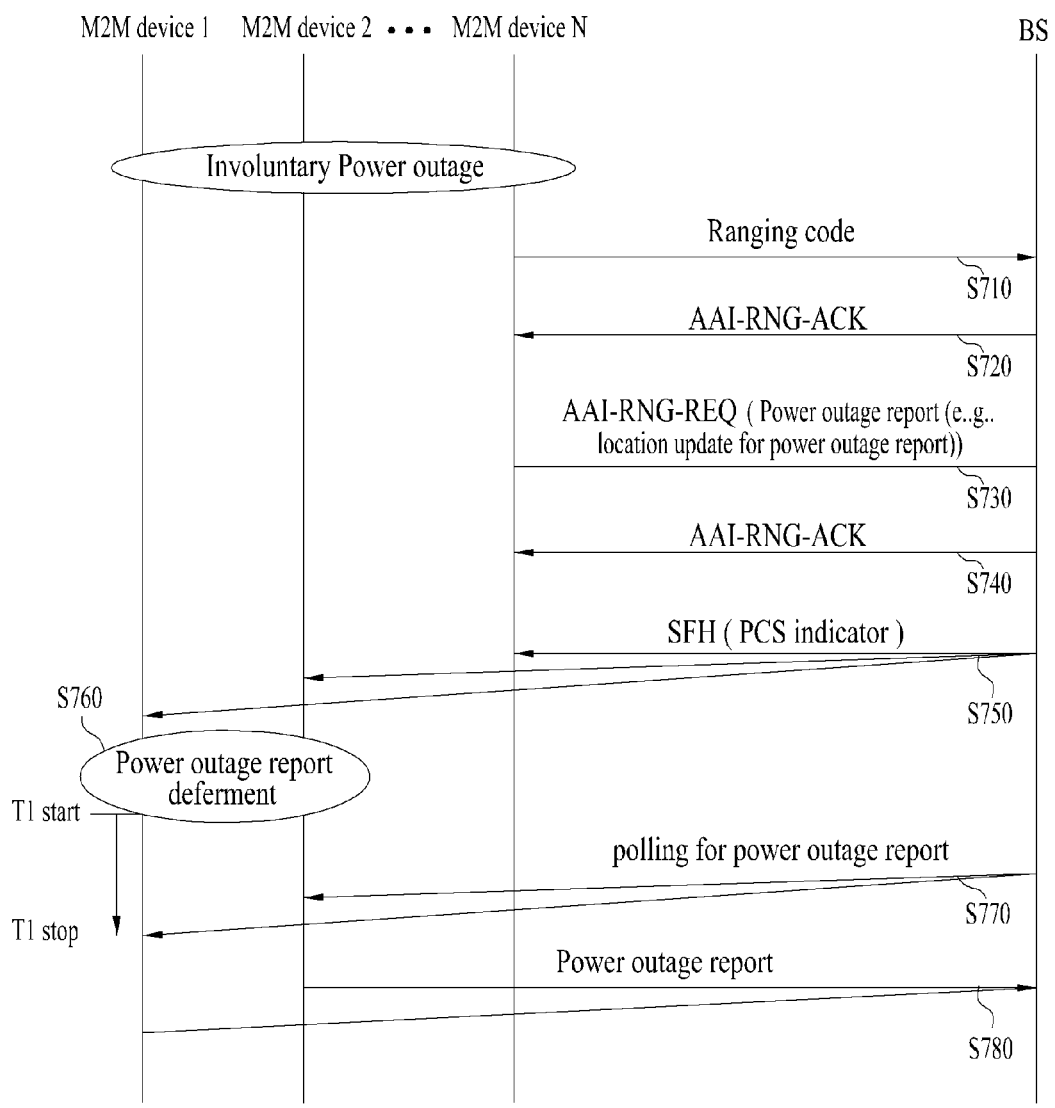

FIG. 6 and FIG. 7 are diagrams for another example to describe a process for M2M devices to perform communications with a base station in case of occurrence of a power outage.

Referring to FIG. 6, a process shown in FIG. 6 is almost identical to the former process shown in FIG. 5. Yet, in the step S550 shown in FIG. 5, the base station transmits the PCS indicator through the AAI-M2M-PO-IND message. Yet, according to the present embodiment, the PCS indicator is transmitted through a NUS A-MAP IE message or an extended non-user specific A-MAP IE message in a step S650. In particular, there is only a difference in a message format for carrying the PCS indicator.

Referring to FIG. 7, a process shown in FIG. 7 is almost identical to the former process shown in FIG. 5. Yet, in the step S550 shown in FIG. 5, the base station transmits the PCS indicator through the AAI-M2M-PO-IND message. Yet, according to the present embodiment, the base station transmits the PCS indicator to an M2M device through a broadcast channel (e.g., super frame header (SFH IE) in a step S750.

Figure 8:
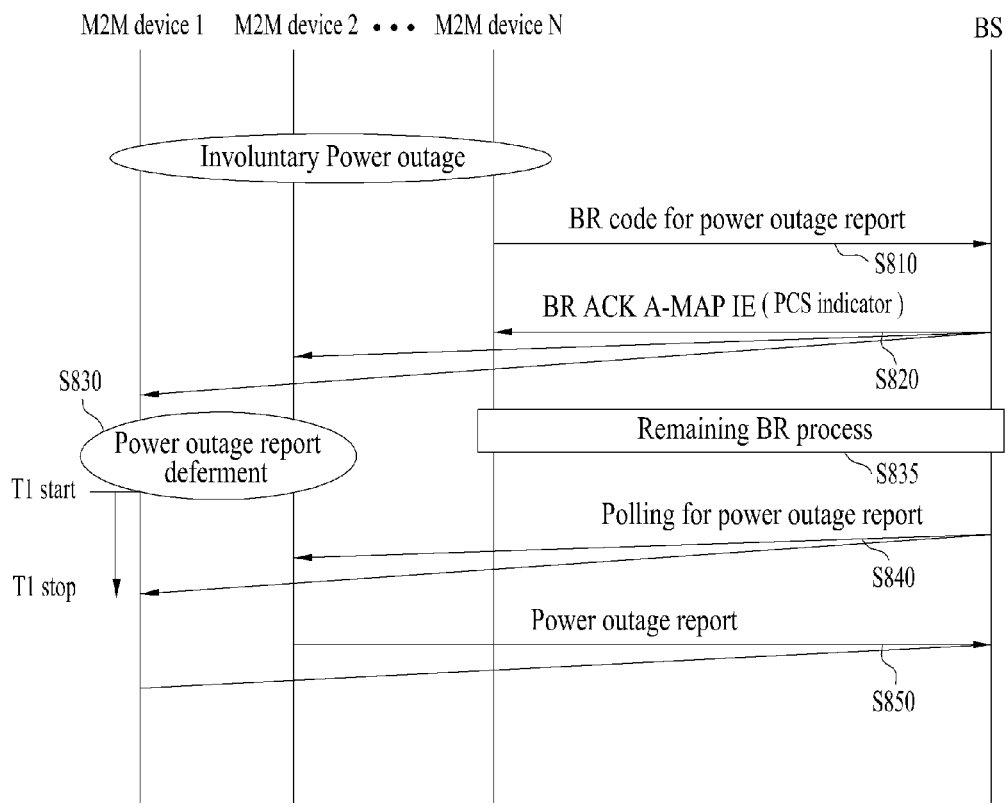
FIG. 8 is a diagram for another example to describe a process for M2M devices to perform communications with a base station in case of occurrence of a power outage.

FIG. 8 is a diagram for another example to describe a process for M2M devices to perform communications with a base station in case of occurrence of a power outage.

According to the present embodiment, assume that involuntary power outage occurs in M2M devices (e.g., M2M device 1, M2M device 2, . . . , M2M device N).

When an involuntary power outage occurs, an M2M device (i.e., M2M device N) currently operating in connected mode can inform a base station of an involuntary power outage situation by transmitting a specific BR code for a power outage report instead of transmitting a ranging code [S810]. If the base station receives a BR code/indicator for a power outage report from the M2M device, the base station has a PCS indicator contained in a BR-ACK A-MAP IE message and is then able to send the BR-ACK A-MAP IE message to other M2M devices (e.g., M2M device 1, M2M device 2) in the same cell of the corresponding M2M device as well as to the M2M device N having sent the BR code/indicator for the power outage report [S820]. In this case, BR-ACK A-MAP IE message format can be represented as Table 9 in the following. Table 9 shows one example of the BR-ACK A-MAP IE message format.

TABLE 9

| Syntax | Size | Notes |
| --- | --- | --- |
| BR-ACK_A-MAP_IE( ) { A-MAP IE Type | 4 | BR-ACK A-MAP IE |
| . . . | . . . | . . . |
| power outage contention BR/ ranging stop (PCS) indicator | 1 | 1: Indicating that contention BRs or random access processes are deferred for a specific period or stopped. |
| . . . | . . . | . . . |

Referring to Table 9, BR-ACK A-MAP IE message can include a 1-bit PCS indicator. Power outage occurring M2M devices expect to receive BR-ACK A-MAP TB from a base station. The base station masks CRC with a masking prefix (=0b0), a type indicator (=0b001) and a masking code (=1, 12 bits) and is then able to send a BR-ACK A-MAP IE message to M2M devices (M2M device 1, M2M device 2, . . . , M2M device N).

If each of the M2M devices (e.g., M2M device 1, M2M device 2) failing in making the power outage report receives the BR-ACK A-MAP IE message including the PCS indicator before attempting a random access process [S820], each processor 120 of the M2M devices (e.g., M2M device 1, M2M device 2) controls an initiation of the random access process to be deferred for a specific time or stopped and may wait for receiving allocation of a resource from the base station [S830].

Thereafter, if each of the M2M devices (e.g., M2M device 1, M2M device 2, etc.), which fail in reporting the power outage occurrence yet, receives a polling for the power outage report from the base station [S840], the corresponding M2M device can transmit a power outage report including a presence or non-presence of a power outage and the like to the base station through a corresponding resource allocated by the polling [S850].

Meanwhile, the M2M device N having transmitted the BR code for the power outage report in the step S810 receives the BR-ACK A-MAP IE message [S820] and is then able to perform a BR process corresponding to itself [S835].

Moreover, if the M2M devices do not receive the BR-ACK A-MAP IE message including an indication value '1' (i.e., indicating that contention BRs or random access processes of the M2M devices are deferred for a specific period or stopped.) of the PCS indicator for a predetermined period from the base station, they perform the random access process.

Figure 9:
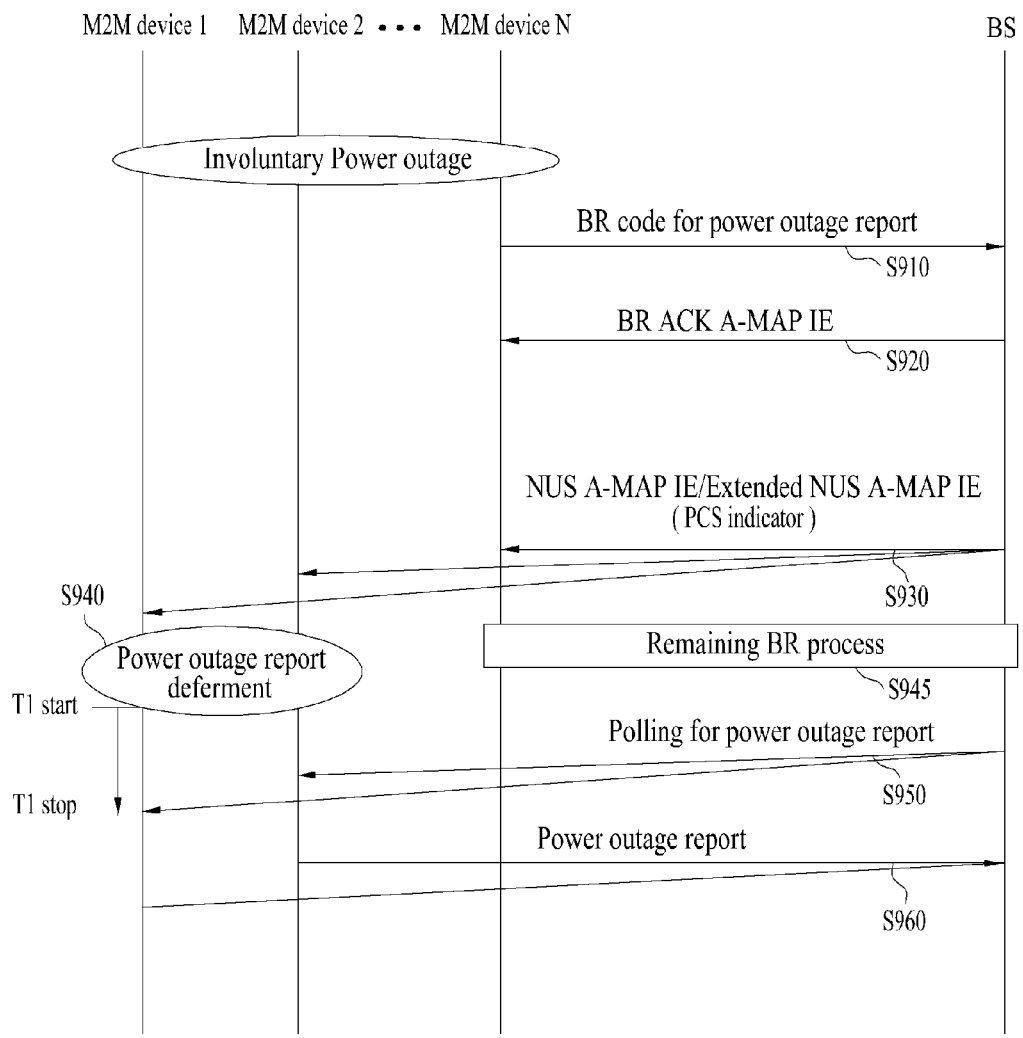
FIG. 9 is a diagram for another example to describe a process for M2M devices to perform communications with a base station in case of occurrence of a power outage.

FIG. 9 is a diagram for another example to describe a process for M2M devices to perform communications with a base station in case of occurrence of a power outage.

According to the present embodiment, assume that involuntary power outage occurs in M2M devices (e.g., M2M device 1, M2M device 2, . . . , M2M device N).

Although the embodiment shown in FIG. 9 is similar to the former embodiment shown in FIG. 8, there are several differences in-between. In particular, in the step S820 shown in FIG. 8, the base station makes the PCS indicator included in the BR-ACK A-MAP IE message and then sends the BR-ACK A-MAP IE message to other M2M devices (e.g., M2M device 1, M2M device 2) in the same cell of the corresponding M2M device as well as to the M2M device N having transmitted the BR code/indicator for the power outage report. Yet, in a step S920 shown in FIG. 9, the base station transmits a BR-ACK A-MAP IE message to the corresponding M2M device N having transmitted the power outage report without making the PCS indicator included in the BR-ACK A-MAP IE message.

Subsequently, in a step S930, the base station makes the PCS indicator included in NUS A-MAP IE, Extended NUS A-MAP IE, or broadcast channel (e.g., super frame header (SFH) and is then able to transmit the PCS indicator to other M2M devices (e.g., M2M device 1, M2M device 2) in the same cell of the corresponding M2M device as well as to the M2M device N. Thereafter, steps S940, S945, S950 and S960 are identical to the steps S830, S840, S840 and S850 shown in FIG. 8, respectively.

In a manner similar to that of using one of BR codes used by a 5-step BR process as an indicator for an M2M power outage, an M2M device is enabled to announce an involuntary power outage by a 3-step BR process using a quick access message. In this case, a specific BR index includes a function of a power outage report.

Table 10 shows one example of AAI-DSA-REQ (Advanced Air Interface-Dynamic Service Addition-request) message including a BR index in a quick access message.

TABLE 10

| Field | Size | Value/Description |
|---|---|---|
| . . . | . . . | |
| For(i=0; i<N-Predefined-BR indices; i++) { | | The mapping of predefined BR index used in quick access message to BR size and BR actions N-Predefined-BR-indices is the number of predefined BR indices [1 . . . 15] |
| Predefined BR index | 4 | Predefined BR index |
| BR action | 2 | 0b00: ertPS service flow requests to resume to maximum sustained rate<br>0b01: aGP service flow requests to switch to Primary QoS parameters<br>0b10: BR<br>0b11: Power outage indicator |
| If(BR action == 0b10) { | | |
| BR size | 11 | Number of bytes requested by the predefined BR index |
| } | | |
| } | | |
| . . . | . . . | . . . |

Referring to Table 10, AAI-DSA-REQ message may include a message initiated (BS-initiated)) and sent to an M2M device by a base station. The AAI-DSA-REQ message may include the message exchanged between the base station and the M2M device before a power outage situation occurs in the M2M device. The AAI-DSA-REQ message may include a predefined BR index and a BR action field. For instance, the base station sets a BR action field, which is set to 0b11, to indicate a power outage indicator and can determine a BR index value, which corresponds to a case that the BR action field value is 0b11, in advance. If the base station transmits a BR index value information corresponding to the determined BR action field value '0b11' to the M2M device via the AAI-DSA-REQ message, the M2M device can obtain information on this power outage indicator through the AAI-DSA-REQ message.

As mentioned in the above description, if the BR action field value is 0b11, it indicates that the predefined BR index included in the AAI-DSA-REQ message is provided for the purpose of the power outage indicator. Thus, one value of the BR action field for the BR index can be used as the power outage indicator. If the BR action field value is 0b10, the AAI-DSA-REQ message can further include a BR size field. In this case, the BR size field indicates the number of bytes requested by a predefined BR index.

According to the contents related to Table 10, for the transmission of a power outage indicator of an M2M device, a base station assigns a predefined BR index as a specific value of a BR action field in a DSA process.

On the contrary, if a BR index for a power outage indicator is predefined on a system and such information is shared between a base station and an M2M device, the M2M device can announce a power outage situation in a manner of transmitting the power outage indicator to the base station using the BR index predefined for the power outage indicator on the system without a DSA process.

Figure 10:
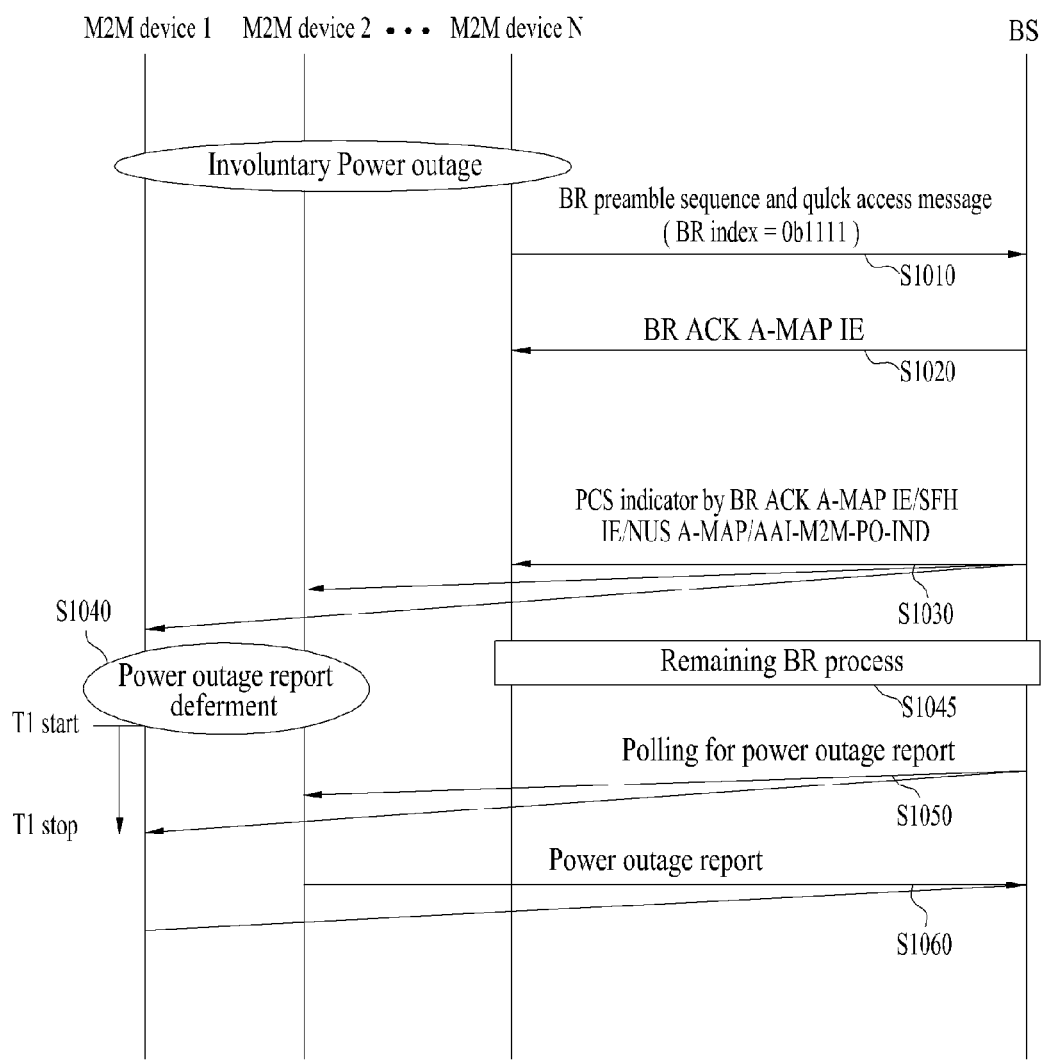
FIG. 10 is a diagram for a further example to describe a process for M2M devices to perform communications with a base station in case of occurrence of a power outage.

FIG. 10 is a diagram for a further example to describe a process for M2M devices to perform communications with a base station in case of occurrence of a power outage.

According to the present embodiment, assume that involuntary power outage occurs in M2M devices (e.g., M2M device 1, M2M device 2, . . . , M2M device N).

Referring to FIG. 10, the M2M device N can send a BR preamble sequence and a quick access message to a base station using a last value (e.g., 0b1111) of a BR index [S1010]. In this case, the last value (e.g., 0b1111) of the BR index is the index predefined for a power outage report. Thereafter, the base station can send a BR-ACK A-MAP IE message indicating a decoding state of the BR preamble sequence to the M2M device N [S1020].

If the base station receives a power outage report for a power outage report or a power outage report indicator from at least one (e.g., M2M device N) of involuntary power outage occurring M2M devices [S1010], the processor 170 of the base station determines that the power outage has occurred in the at least one M2M device in the corresponding cell and is then able to transmit a PCS indicator to the rest (e.g., M2M device 1, M2M device 2), which fail in transmitting the power outage indicator, of the M2M devices in the cell as well as to the M2M device N via such a message as BR-ACK A-MAP IE message, AAI-M2M-PO-IND message, NUS A-MAP IE message, extended NUS A-MAP IE message, SFH IE message and the like [S1030].

If each of the M2M devices (e.g., M2M device 1, M2M device 2) failing in making the power outage report receives the message (e.g., BR-ACK A-MAP IE message, AAI-M2M-PO-IND message, NUS A-MAP IE message, extended NUS A-MAP IE message, SFH IE message, etc.) including the PCS indicator before attempting a random access process [S1030], each processor 120 of the M2M devices (e.g., M2M device 1, M2M device 2) controls an initiation of the random access process to be deferred for a specific time or stopped and may wait for receiving allocation of a resource from the base station [S104].

Meanwhile, if the M2M device N having transmitted the BR code for the power outage report in the step S1010 receives the BR-ACK A-MAP IE message from the base station [S1020] and then receives a PCS indicator indicating to attempt a random access [S1030], the M2M device N performs the remaining BR process [S1045].

Thereafter, if each of the M2M devices (e.g., M2M device 1, M2M device 2, etc.), which fail in reporting the power outage occurrence yet, receives a polling for the power outage report from the base station [S1050], the corresponding M2M device can transmit a power outage report including a presence or non-presence of a power outage and the like to the base station through a corresponding resource allocated by the polling [S1060].

In IEEE 802.16e system, an M2M device can inform a base station of a power outage by the signaling defined in IEEE 802.16m system and the base station can transmit a PCS indicator to the power outage occurring M2M devices. In this case, the PCS indicator can be transmitted by multicast or broadcast (e.g., broadcast CID, multicast CID). Yet, in the IEEE 802.16e system, it is unable to use such a method dedicated to the IEEE 802.16m system as a 3-step BR method using one of a quick access message, AAI-RNG-ACK, BR-ACK A-MAP IE, SFH, and NUS A-MAP IE. Instead of the SFH, DCD can be used.

As mentioned in the foregoing description, involuntary power outage may occur in M2M devices in M2M system. In this case, the involuntary power outage may occur in most of the M2M devices in the area belonging to the corresponding M2M device. After the occurrence of the power outage, the corresponding M2M devices will report it to the base station at the same time. Hence, the possibility of contention by many ranging processes increases in the M2M devices in idle mode, while the possibility of contention by bandwidth request processes increases in the M2M devices in connected mode. To solve this problem, according to the various embodiments mentioned in the foregoing description, resolution for the collision between the base station and the M2M devices can be provided, whereby unnecessary power consumption of the M2M devices can be reduced and the efficiency of system resources can be considerably raised.

The above-described embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

A method of transmitting and receiving a power outage report and apparatus therefor are industrially available for various communication systems including 3GPP LTE, 3GPP LTE-A, IEEE 802 and the like.

What is claimed is:

1. A method of transmitting a power outage report at a machine-to-machine (M2M) device in a wireless communication system, the method comprising:
receiving, from a base station, a first message including a predefined bandwidth request (BR) index and a corresponding BR action which is used in case of a three step BR procedure of the M2M device in a connected state, wherein the first message is a dynamic service addition (DSA) request message, and the predefined BR index is used to indicate an abnormal power outage in the M2M device in the connected state;
transmitting, to the base station, a second message including the predefined BR index to indicate that the abnormal power outage has occurred in the M2M device; and
starting a timer, after transmitting the second message, to wait for a third message including an acknowledgement of the second message from the base station within a predetermined time.

2. The method of claim 1, wherein a value of the predefined BR index in a BR action field of the first message is set to 0b11.

3. The method of claim 1, wherein a state of the M2M device is a connected mode state.

4. The method of claim 1, wherein the third message includes an indication indicating whether the M2M device should stop a bandwidth request process of the base station.

5. The method of claim 4, wherein when the indication indicates that the M2M device should not stop the bandwidth request process, the M2M device performs a remaining bandwidth request.

6. A method of receiving a power outage report at a base station in a wireless communication system, the method comprising:

transmitting, to a machine-to-machine (M2M) device, a first message including a predefined bandwidth request (BR) index and a corresponding BR action which is used in case of a three step BR procedure of the M2M device in a connected state, wherein the first message is a dynamic service addition (DSA) request message, and the predefined BR index is used to indicate an abnormal power outage in the M2M device in the connected state;

receiving, from the M2M device, a second message including the predefined BR index to indicate that the abnormal power outage has occurred in the M2M device; and transmitting to the M2M device, a third message including an acknowledgement of the second message within a predetermined time.

7. The method of claim 6, wherein a value of the predefined BR index in a BR action field of the first message is set to 0b11.

8. A machine-to-machine (M2M) device of transmitting a power outage report in a wireless communication system, the M2M device comprising:

a receiver;

a transmitter; and a processor configured to:

control the receiver to receive, from a base station, a first message including a predefined bandwidth request (BR) index and a corresponding BR action which is used in case of a three step BR procedure of the M2M device in a connected state, wherein the first message is a dynamic service addition (DSA) request message, and the predefined BR index is used to indicate an abnormal power outage in the M2M device in the connected state, control the transmitter to transmit, to the base station, a second message including the predefined BR index to indicate that the abnormal power outage has occurred in the M2M device, and start a timer, after transmitting the second message, to wait for a third message including an acknowledgement of the second message from the base station within a predetermined time.

9. The method of claim 8, wherein a value of the predefined BR index in a BR action field of the first message is set to 0b11.

10. A base station of receiving a power outage report at a base station in a wireless communication system, the base station comprising:

a transmitter;

a receiver; and a processor configured to:

control the transmitter to transmit, to a machine-to-machine (M2M) device, a first message including a predefined bandwidth request (BR) index and a corresponding BR action which is used in case of a three step BR procedure of the M2M device in a connected state, wherein the first message is a dynamic service addition (DSA) request message, and the predefined BR index is used to indicate an abnormal power outage in the M2M device in the connected state, control the receiver to receive, from the M2M device, a second message including the predefined BR index to indicate that the abnormal power outage has occurred in the M2M device, and control the transmitter to transmit, to the M2M device, a third message including an acknowledgement of the second message within a predetermined time.

11. The base station of claim 10, wherein a value of the predefined BR index in a BR action field of the first message is set to 0b11.

* * * * *